United States Patent
Ohara et al.

(10) Patent No.: US 6,912,352 B2
(45) Date of Patent: Jun. 28, 2005

(54) DIGITAL DATA RECORDING AND REPRODUCING SYSTEM CAPABLE OF DETECTING DISCONTINUITY OF DATA

(75) Inventors: Eiji Ohara, Tokyo (JP); Kenichi Asano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 925 days.

(21) Appl. No.: 09/725,103

(22) Filed: Nov. 29, 2000

(65) Prior Publication Data

US 2001/0041060 A1 Nov. 15, 2001

(30) Foreign Application Priority Data

Jan. 26, 2000 (JP) ........................................ 2000-017521

(51) Int. Cl.[7] .............................. H04N 7/26; H04N 7/64
(52) U.S. Cl. .......................... 386/111; 386/109; 386/113
(58) Field of Search ................................. 386/111, 109, 386/112, 83, 46, 124, 125, 126, 45, 40, 1, 27, 33, 95, 113, 21; 725/86, 87, 101, 131, 139, 151

(56) References Cited

U.S. PATENT DOCUMENTS 6,671,290 B1 * 12/2003 Murayama et al. ......... 370/486

FOREIGN PATENT DOCUMENTS

| EP | 000782332 A2 * | 7/1997 |
| JP | 11122579 | 4/1999 |

OTHER PUBLICATIONS

"News Reports" Nikkei Electronics; p. 31, (Jul. 12, 1999) (With Translation).

* cited by examiner

Primary Examiner—Robert Chevalier
(74) Attorney, Agent, or Firm—Birch, Stewart, Kolasch & Birch, LLP

(57) ABSTRACT

A digital data recording and reproducing system records only programs desired by a user. A program selector in a digital VTR or in a set-top box selects only the programs desired by the user from a plurality of programs received by a tuner in the set-top box. The programs include video, audio, data and so forth that are subjected to data compression in digital broadcasting. The program selector selects the programs in response to a user instruction sent from the user via a man-machine interface, and transfers the selected programs to a recorder. Besides, the digital data recording and reproducing system includes a decoder including a discontinuity detector for detecting discontinuity between the programs by using information specified by IEC/ISO 13818 while said decoder is decoding the compressed digital data of the programs. The discontinuity detector restarts the decoder when detecting the discontinuity between the programs.

11 Claims, 6 Drawing Sheets

DIGITAL DATA RECORDING AND REPRODUCING SYSTEM CAPABLE OF DETECTING DISCONTINUITY OF DATA

BACKGROUND OF THE INVENTION

1. Field of the Invention

The present invention relates to a digital data recording and reproducing system for receiving digital broadcasting that multiplexes and transmits a plurality of programs containing video, audio, data and so forth passing through data compression, for recording the received compressed programs as digital data, and for reproducing the recorded digital data.

To be more specific, as a medium for straightforwardly recording and reproducing digital broadcasts that use compressed video, audio, data and so forth passing through data compression according to MPEG (Moving Picture Experts Group)-2, there are digital VTRs, DVDs (Digital Video Disks) and hard disks for simply recording the digital broadcasts without decoding them according to the MPEG-2.

2. Description of Related Art

Figure 6:
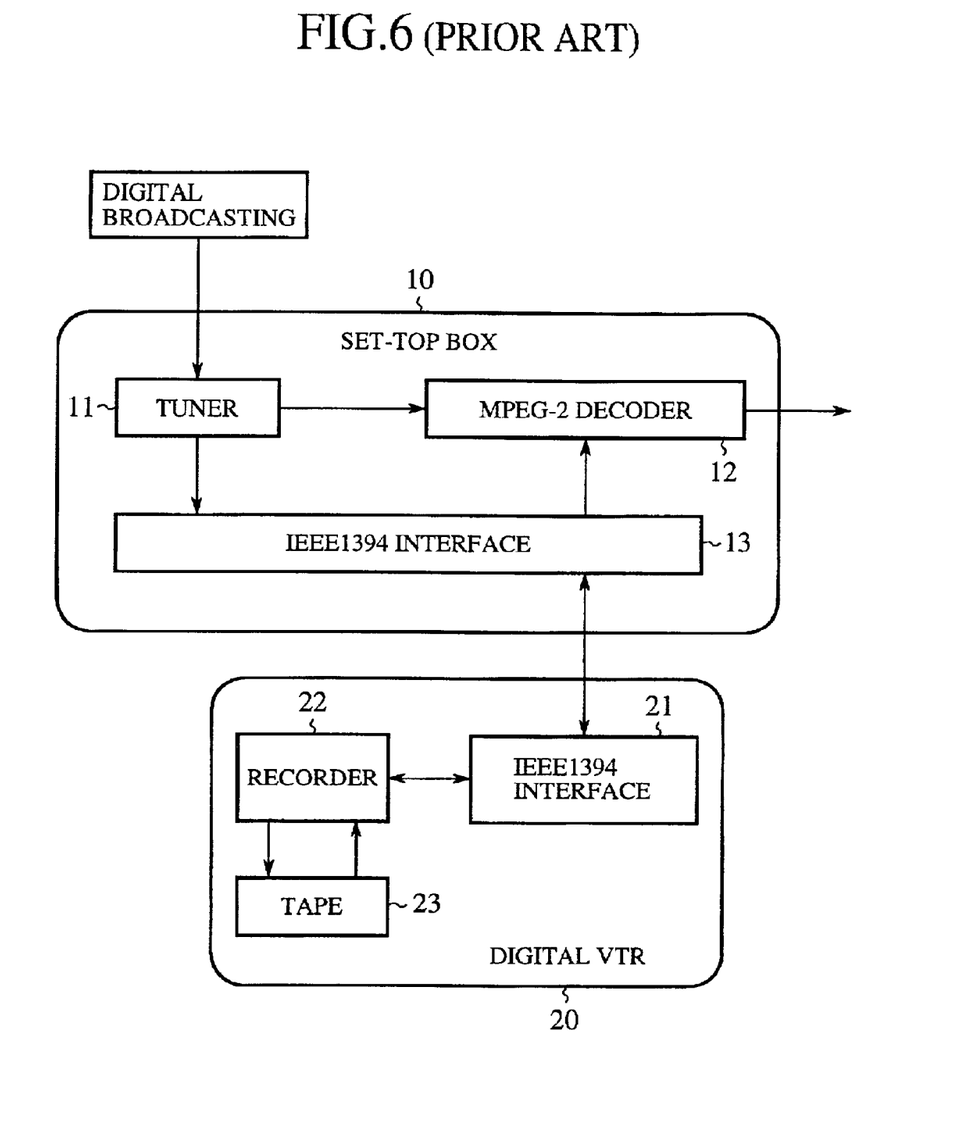
FIG. 6 is a block diagram showing a configuration of a conventional digital data recording and reproducing system.

FIG. 6 is a block diagram showing a configuration of a conventional digital data recording and reproducing system described on page 31 of the Journal of Nikkei Electronics of 1999.7.12. In this figure, the reference numeral 10 designates a set-top box as a home use terminal, 11 designates a tuner, 12 designates an MPEG-2 decoder, 13 designates an IEEE1394 interface, 20 designates a digital VTR, 21 designates an IEEE1394 interface, 22 designates a recorder, and 23 designates a tape.

Next, the operation of the conventional system will be described.

The material to be recorded and reproduced in this example is CS (Communication Satellite) digital broadcasting. The broadcast waves of the CS digital broadcasting are supplied to the set-top box 10, and the tuner 11 selects the carrier of a desired frequency. In the CS digital broadcasting, one frequency carrier includes a plurality of programs multiplexed thereon.

In the examples of FIG. 6, the carrier data (digital data) with the frequency selected by the tuner 11 is supplied to the digital VTR 20 via the IEEE1394 interface 13. Although the IEEE1394 interface is a digital interface with a unique protocol, the IEEE1394 interface 13 on the set-top box 10 side and the IEEE1394 interface 21 on the digital VTR 20 side have input and output terminals ensuring transfer of the data between them without change. The digital data output from the IEEE1394 interface 21 of the digital VTR 20 is recorded on the tape 23 by the recorder 22 without any change.

Playback of the tape 23 by the digital VTR 20 will reproduce the original carrier data (digital data) at the same frequency. The reproduced digital data is supplied to the set-top box 10 via the IEEE1394 interfaces 21 and 13 so that the MPEG-2 decoder 12 decodes the digital data to restore the programs consisting of video, audio, data and so forth, and to output them from the set-top box 10.

With the foregoing configuration, the conventional digital data recording and reproducing system has the following problems. First, since the carrier data with the frequency selected by the tuner 11 is recorded straightforward, the plurality of programs are recorded as they are. Thus, the program data a user of the system does not actually desire are also recorded, which impairs the recording efficiency of the tape 23, and hence the recording duration of the tape 23.

A second problem relates to the discontinuity of the data input to the MPEG-2 decoder 12 of the set-top box 10. The recorded and reproduced digital data consist of not only data continuously received by the set-top box 10, but also discontinuous data, which is analogous to a single tape of an analog VTR including a plurality of recorded programs.

In the MPEG-2 decoding by the MPEG-2 decoder 12, since the input signal includes a plurality of multiplexed programs, the input signal is divided into specific programs and media according to the ISO/IEC 13818-1 standard. In the course of this, when the input signal contains discontinuity, the parameters for extracting the programs and media from the input signal can take unexpected values. Whether the abnormal parameters are considered a data error or not depends on the contents of the abnormality, or on the configuration for isolating the programs and media. In addition, since the detection of the parameters takes a substantial time period, the video, audio, data and so forth can be output with some errors until the abnormality is detected.

In addition, the MPEG-2 decoder 12 carries out video decoding according to ISO/IEC 13818-2 standard after separating the programs and media: It carries out such processings as variable length decoding, dequantization, inverse DCT (Discrete Cosine Transform) and motion compensated prediction. In the video decoding also, the input signal, that is, the signal passing through the isolation of the programs and media becomes discontinuous. Thus, it will cause some error in the decoding, thereby outputting abnormal video until the error of the input signal is detected and then the output of the video is halted. As in the isolation of the programs and media, it depends on the contents of the abnormality and the configuration of the processings whether the data is considered to be abnormal or not, and in addition, the error detection takes a non-negligible time period.

A common set-top box not involved in recording and reproduction can recognize timing its user switches the programs from his or her operation of a keyboard, for example. Thus, it can recognize the timing of the discontinuity of the data. Every time the discontinuity of the data occurs, the set-top box can restart the MPEG-2 decoder 12 in order to handle the input signal as new data. Thus, it can prevent abnormal video or audio decoded data from being output by starting receiving earlier than when carrying out error detection, and by halting the output of the video, audio and data (by displaying a particular color all over the screen in the case of video, for example).

However, as to the system required to carry out recording and reproduction, since the MPEG-2 decoder 12 cannot detect the discontinuity of the reproduced digital signal quickly, it has a problem of outputting abnormal decoded data for a long time.

SUMMARY OF THE INVENTION

The present invention is implemented to solve the foregoing problems. Therefore, a first object of the present invention is to improve the recording efficiency of a tape by enabling the tape to record only programs a user of the system really wishes to record from the carrier data with the frequency selected by a tuner.

Another object of the present invention is to prevent an abnormal output over a long time by quickly detecting the discontinuity of the digital data reproduced by an MPEG-2 decoder, when a signal received by a set-top box is discontinuous, and hence the digital data supplied to the MPEG-2 decoder after recording and reproduction are also discontinuous.

According to a fist aspect of the present invention, there is provided a digital data recording and reproducing system comprising: a receiver for receiving transmitted digital data including a plurality of multiplexed programs consisting of video, audio, data and so forth which are subjected to compression; a program selector for selecting a program to be recorded from among the plurality of multiplexed programs in response to an instruction from a user; a recorder for storing digital data of the program selected by the program selector, and for reproducing recorded digital data; and a decoder for decoding digital data reproduced by the recorder to restore the selected program.

Here, the receiver and the decoder may be included in a set-top box, and the program selector and the recorder may be included in a digital VTR.

The receiver, the decoder and the program selector may be included in a set-top box, and the recorder may consist of a digital VTR.

According to a second aspect of the present invention, there is provided a digital data recording and reproducing system comprising: a receiver for receiving transmitted digital data including a plurality of multiplexed programs consisting of video, audio, data and so forth which are subjected to compression; a recorder for storing received digital data, and for reproducing recorded digital data; a decoder for decoding digital data reproduced by the recorder to restore the programs; and a discontinuity detector for detecting a discontinuity between the programs while the decoder is decoding the compressed digital data of the programs, wherein the discontinuity detector restarts the decoder upon detecting the discontinuity between the programs.

The discontinuity detector may detect the discontinuity between the programs by using information specified in IEC/ISO 13818.

The discontinuity detector may detect the discontinuity between the programs by using program_number specified in ISO/IEC 13818 as information for indicating a number of each of the programs.

The discontinuity detector may utilize a continuity_counter that is specified in ISO/IEC 13818 and increments with each transport packet having a corresponding PID (Packet Identification) in a transport packet layer, and detect the discontinuity between the programs in response to a change in the increment of the continuity_counter.

The discontinuity detector may utilize a Decoding Time Stamp specified in ISO/IEC 13818 for indicating a time when each access unit is to be decoded, and detect the discontinuity between the programs in response to a time difference between the Decoding Time Stamp.

The discontinuity detector may utilize a vbv_delay in a picture header, and detect the discontinuity between the programs by comparing an amount of data assumed to be stored in a buffer calculated from the vbv_delay with an amount of data of the program actually stored in the buffer before decoding.

The discontinuity detector may utilize at least two of a program_number, a continuity_counter, Decoding Time Stamp and a vbv_delay in a picture header, which are specified in ISO/IEC 13818 for indicating a number of each program, for incrementing with each transport packet with a corresponding PID in a transport packet layer, for decoding time of each access unit and for indicating an amount of time a picture header should reside in a VBV buffer before decoding, respectively.

The digital data recording and reproducing system may further comprise a program switching signal addition section for recording, when a program to be stored is switched in response to a user instruction, not only the program itself, but also a program switching signal indicating the program switching, wherein the discontinuity detector may decide that the program discontinuity takes place when it detects the program switching signal.

The discontinuity detector may output fixed data when detecting the discontinuity between the programs.

DETAILED DESCRIPTION OF THE PREFERRED EMBODIMENTS

The invention will now be described with reference to the accompanying drawings.

Embodiment 1

Figure 1:
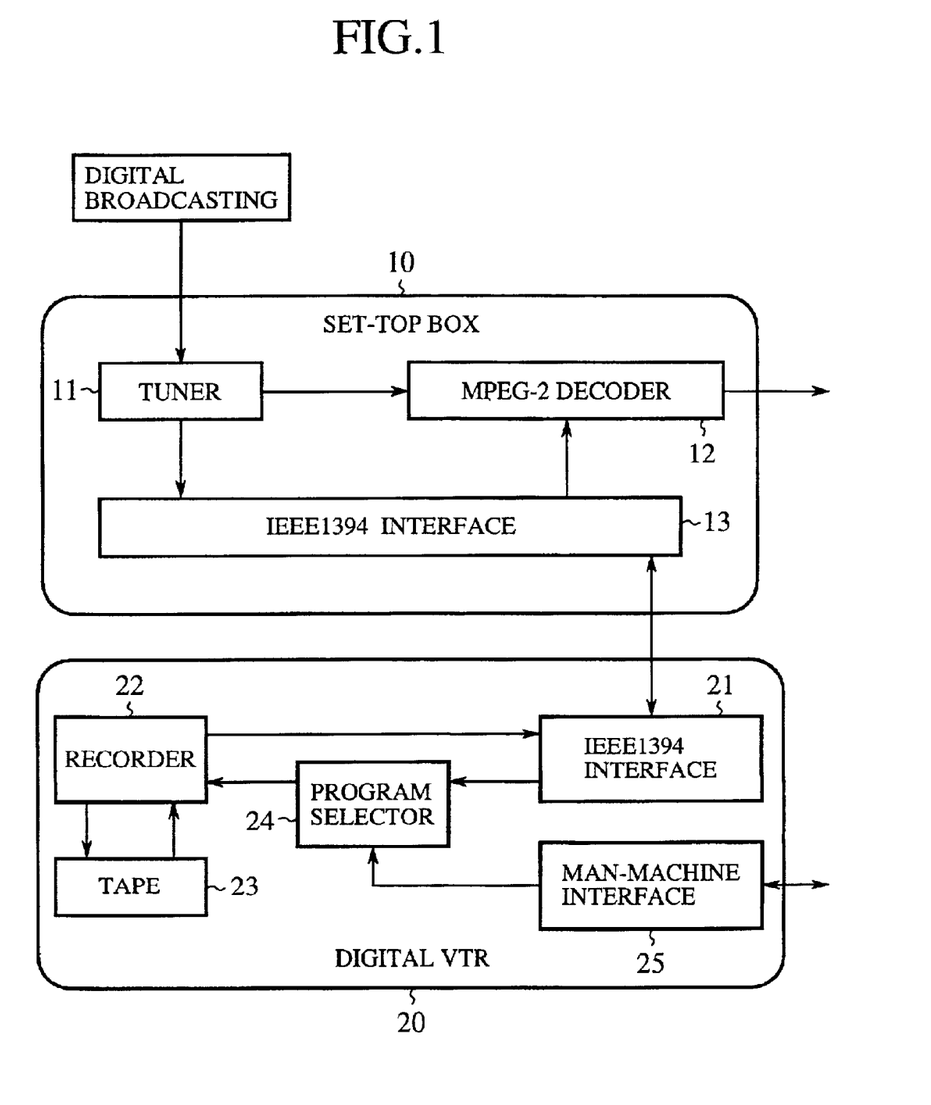
FIG. 1 is a block diagram showing a configuration of an embodiment 1 of a digital data recording and reproducing system in accordance with the present invention.

FIG. 1 is a block diagram showing a configuration of an embodiment 1 of a digital data recording and reproducing system in accordance with the present invention. In this figure, the reference numeral 24 designates a program selector for selecting a program to be recorded; and 25 designates a man-machine interface for providing a command from a user to the program selector 24. The remaining configuration is the same as that of the conventional system as shown in FIG. 6.

Next, the operation of the present embodiment 1 will be described.

In digital broadcasting, a plurality of programs are multiplexed onto a carrier of a specific frequency. The tuner 11 selects one of the carriers with a frequency including a required program from the input signal. In this example, although the input is assumed to be the digital broadcasting, it can also be applied to digital communications in exactly the same manner.

The carrier selected by the tuner 11 is transferred to the digital VTR 20 via the IEEE1394 interface 13 in the set-top box 10, and is supplied to the program selector 24 via the IEEE1394 interface 21 in the digital VTR 20.

The man-machine interface 25 in the digital VTR 20 provides the program selector 24 with a selection signal generated from program selection information externally set by a user operation or the like. The program selector 24 extracts only a specified program signal from the carrier data (digital data) with the input frequency in response to the selection signal, and supplies the program signal to the recorder 22. The selection of the program is carried out in the same manner as the program separation specified by the ISO/IEC 13818-1 standard. The digital data of the specified program is recorded on the tape 23 by the recorder 22. Here, ISO/IEC 13818-1 is a section of ISO/IEC 13818 specifying multimedia multiplexing and a coding scheme of sync codes.

When reproducing the program from the tape 23, the digital data of the recorded specified program is supplied to the MPEG-2 decoder 12 via the IEEE1394 interfaces 21 and 13. The MPEG-2 decoder 12 separates the media such as video and audio parts constituting the specified program. When the isolated medium is video, it is decoded by the processings according to the ISO/IEC 13818-2 standard including the variable length decoding, dequantization, inverse DCT and motion compensated prediction. On the other hand, when it is audio, the audio is decoded according to the ISO/IEC 13818-3 standard. Here, ISO/IEC 13818-2 is a part of ISO/IEC 13818 specifying video coding schemes, and ISO/IEC 13818-3 is a part of ISO/IEC 13818 specifying audio coding schemes.

Figure 2:
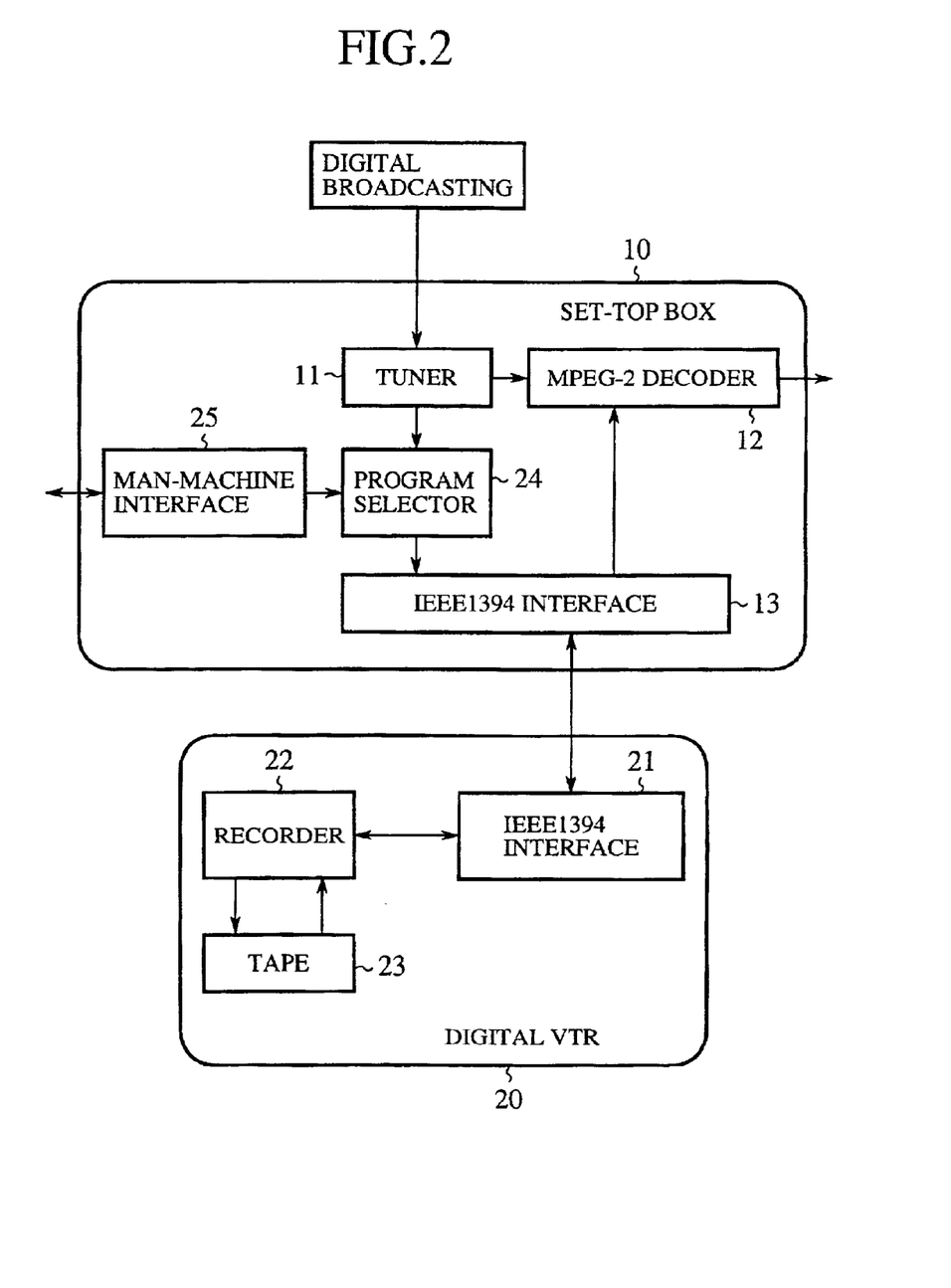
FIG. 2 is a block diagram showing another configuration of the embodiment 1 of the digital data recording and reproducing system in accordance with the present invention.

Although the man-machine interface 25 and program selector 24 are installed in the digital VTR 20 as shown in FIG. 1 in the present embodiment 1, they can be installed in the set-top box 10 as shown in FIG. 2.

As described above, the present embodiment 1 is configured such that the program selector 24 extracts only the digital data of a desired program from among the carrier data with a particular frequency selected by the tuner 11, and the recorder 22 records the extracted digital data. Thus, it offers an advantage of being able to improve the recording efficiency of the tape 23 and to increase the recording duration because it can reduce the digital data recorded on the tape 23 of the digital VTR 20 as compared with the conventional digital data recording and production system.

Embodiment 2

Figure 3:
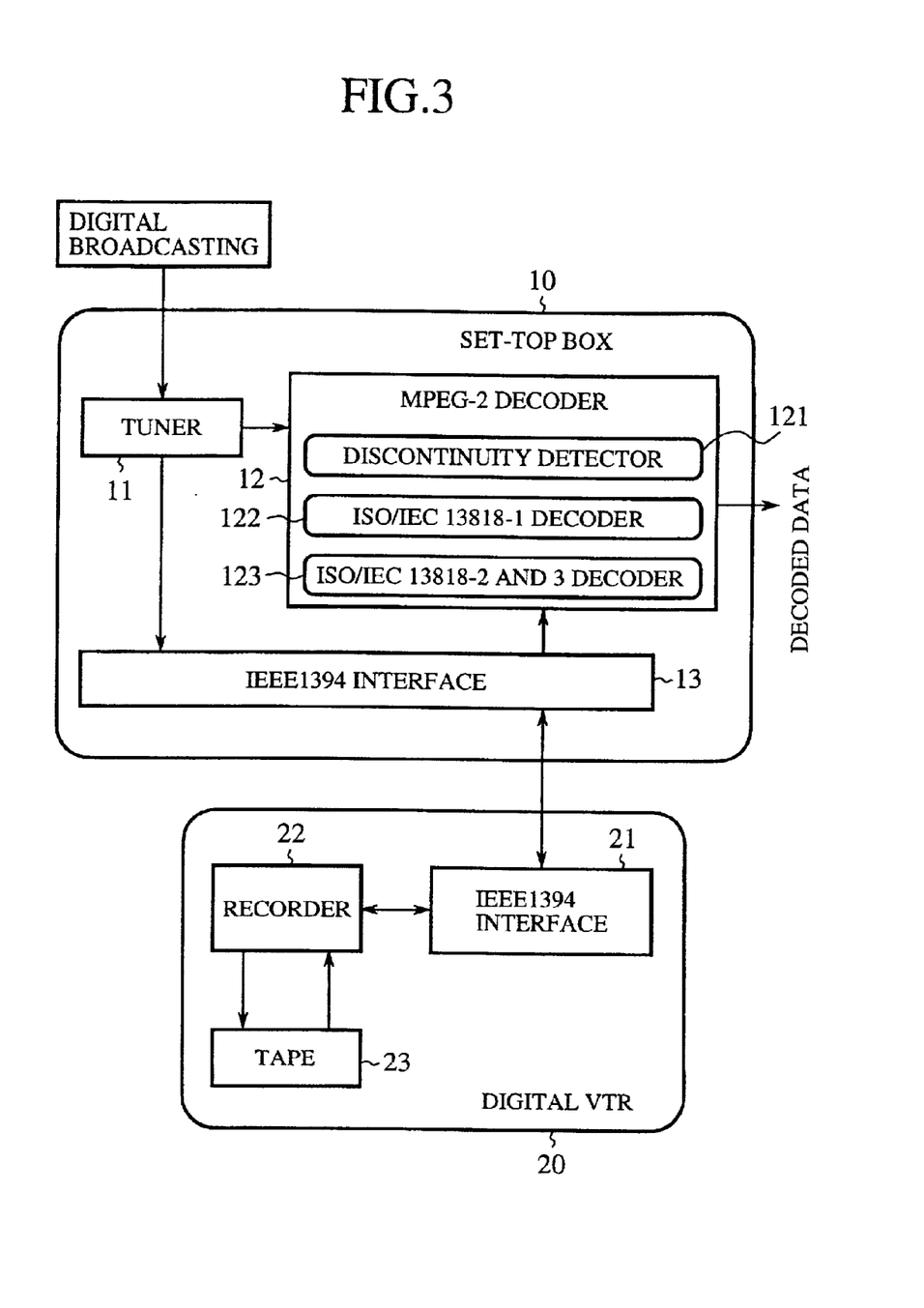
FIG. 3 is a block diagram showing a configuration of embodiments 2–7 of the digital data recording and reproducing system in accordance with the present invention.

FIG. 3 is a block diagram showing a configuration of an embodiment 2 of the digital data recording and reproducing system in accordance with the present invention. In the MPEG-2 decoder 12 in FIG. 3, the reference numeral 121 designates a discontinuity detector for detecting discontinuities between programs; 122 designates an ISO/IEC 13818-1 decoder for separating the programs according to the ISO/IEC 13818-1 standard; and 123 designates an ISO/IEC 13818-2 and 3 decoder for decoding the digital data according to the ISO/IEC 13818-2 and 3 standard. The remaining configuration is the same as that of the conventional system as shown in FIG. 6.

Next, the operation of the present embodiment 2 will be described.

As in the embodiment 1, since the digital broadcasting multiplexes a plurality of programs onto each carrier of a certain frequency, the tuner 11 selects the carrier with a frequency including a desired program from the input signals. The carrier selected by the tuner 11 is transferred to the digital VTR 20 via the IEEE1394 interface 13 in the set-top box 10, and is supplied to the recorder 22 via the IEEE1394 interface 21 in the digital VTR 20.

The recorder 22 writes the carrier data (digital data) with the selected frequency on the tape 23. A playback of the tape 23, on the other hand, will supply the recorded digital data to the MPEG-2 decoder 12 via the IEEE1394 interfaces 21 and 13.

In the MPEG-2 decoder 12, the ISO/IEC 13818-1 decoder 122 isolate the program according to the ISO/IEC 13818-1 standard, and the ISO/IEC 13818-2 and 3 decoder 123 decodes the program according to the ISO/IEC 13818 standard, thereby recovering the video, audio and data constituting the program. In the course of the MPEG-2 decoding, the discontinuity detector 121 detects the discontinuities between the programs on the basis of the information specified in IEC/ISO 13818.

Detecting a discontinuity, a controller (not shown) of the MPEG-2 decoder 12 restarts the MPEG-2 decoder 12. In response to this, the ISO/IEC 13818-1 decoder 122 establishes sync of the TS (Transport Stream) packets specified by ISO/IEC 13818-1 from the input signal. After establishing the sync, the ISO/IEC 13818-1 decoder 122 acquires parameters of the TS packet layer specified by the ISO/IEC 13818-1 standard. Completing the acquisition of the parameters, the ISO/IEC 13818-1 decoder 122 sends digital data (elementary stream) to the ISO/IEC 13818-2 and 3 decoder 123.

Receiving the digital data, the ISO/IEC 13818-2 and 3 decoder 123 starts decoding of the video and audio according to the ISO/IEC 13818-2 and 3 standards. Until the decoded data is input and a first video is displayed, the screen displays a particular color or a particular character.

As described above, the present embodiment 2 is configured such that it restarts the MPEG-2 decoder 12 each time the discontinuity between the programs is detected while carrying out MPEG-2 decoding of the recorded and reproduced program. As a result, it can detect quickly that the reproduced program is switched, making it possible to prevent the output of the abnormal video, audio or data as in the conventional digital data recording and reproduction system.

Figure 4:
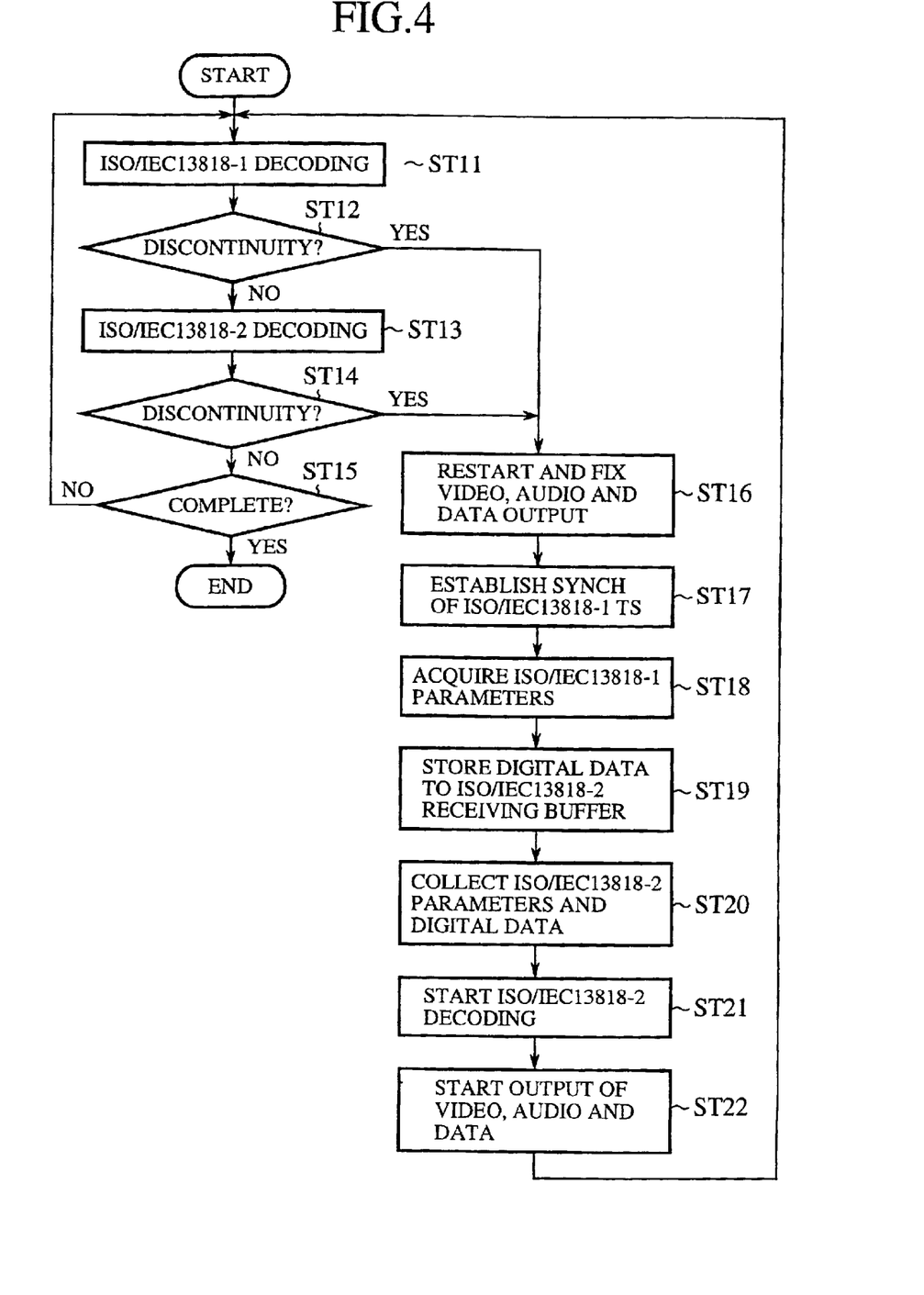
FIG. 4 is a flowchart illustrating a procedure of the processing of an MPEG-2 decoder in the embodiments 2–7 in accordance with the present invention.

FIG. 4 is a flowchart illustrating a procedure of the processing of the MPEG-2 decoder 12 in the present embodiment 2. At step ST11, the ISO/IEC 13818-1 decoder 122 in the MPEG-2 decoder 12 separates the programs reproduced from the tape 23. At step ST12, the discontinuity detector 121 detects whether there is any discontinuity between the programs during the decoding. If no discontinuity is detected, the ISO/IEC 13818-2 and 3 decoder 123 decodes the digital data according to the ISO/IEC 13818-2 and 3 standards at step ST13, thereby recovering the program.

At step ST14, when no discontinuity is detected during the decoding, a decision is made as to whether the processing is completed at step ST15. When completing the decoding, which means turning off power, for example, the processing usually returns to step ST11. If the discontinuity detector 121 detects the discontinuity at step ST12 or ST14, the processing proceeds to step ST16.

At step ST16, the MPEG-2 decoder 12 outputs fixed data because its controller restarts the MPEG-2 decoder 12, and hence it cannot output the decoded data. For example, as for the video data, it outputs such data as displaying a fixed pattern on a display not shown. At step ST17, the ISO/IEC 13818-1 decoder 122 establishes the sync of the TS packets as specified in the ISO/IEC 13818-1 standard. At step ST18 following the establishment of the sync, the ISO/IEC 13818-1 decoder 122 captures the parameters specified in the ISO/IEC 13818-1 standard.

After acquiring the parameters, the decoding is restarted upon returning to step ST11. However, the restart processing is described at steps ST19 and ST20 in FIG. 4. At step ST19, the ISO/IEC 13818-1 decoder 122 transfers digital data such as video, audio and data to the ISO/IEC 13818-2 and 3 decoder 123 to be stored in a received buffer. At step ST20, the ISO/IEC 13818-2 and 3 decoder 123 acquires the parameters and the digital data supplied, and starts decoding of the digital data according to the ISO/IEC 13818-2 and 3 standards at step ST21. At step ST22, halting the output of the fixed data which is output at step ST16, the video, audio, data and so forth constituting the program are recovered.

As described above, the present embodiment 2 is configured such that it restarts the MPEG-2 decoder 12 when the discontinuity between the programs is detected while carrying out MPEG-2 decoding of the recorded and reproduced programs. As a result, it offers an advantage of being able to quickly detect the switching between the reproduced programs, and hence to prevent the output of the abnormal video, audio or data, which can occur in the conventional digital data recording and reproduction system.

Embodiment 3

The present embodiment 3 utilizes the program_number specified in the ISO/IEC 13818-1 standard as a concrete method applied to the discontinuity detector 121 in the embodiment 2. The program_number according to the ISO/IEC 13818-1 standard indicates the number of the program (a channel of the common broadcasting, for example). Thus, a change in the program_number indicates a change in the program, that is, a discontinuity between the programs.

Thus, the discontinuity detector 121 of the embodiment 3 detects the change in the program_number as the discontinuity between the programs, thereby restarting the MPEG-2 decoder 12.

As described above, the present embodiment 3 is configured such that the discontinuity detector 121 detects the change in the program_number as the discontinuity between the programs during MPEG-2 decoding of the recorded and reproduced programs, and restarts the MPEG-2 decoder 12 when the discontinuity is detected. As a result, it offers an advantage of being able to detect the switching between the reproduced programs, making it possible to prevent the output of abnormal video, audio and data.

Embodiment 4

The present embodiment 4 utilizes, as a concrete method to be applied to the discontinuity detector 121 of the embodiment 2, the continuity_counter that indicates the continuity of transport packets having the corresponding PID (Packet Identification) in the transport packet layer specified in the ISO/IEC 13818-1 standard. In ISO/IEC 13818-1, it is specified that the value of the continuity_counter (four bits) of the continuous transport packets increments by one with each transport packet having the corresponding PID in the transport packet layer, and the value is continuous.

At the switching point between the programs, that is, at the discontinuous point, a discontinuity takes place in the continuity_counter. In view of this, the discontinuity detector 121 of the present embodiment 4 has a function of checking the continuity in the continuity_counter of the transport packets having the corresponding PID in the transport packet layer, so that it restarts the MPEG-2 decoder 12 in response to the detection of the discontinuity.

As described above, the present embodiment 4 is configured such that the discontinuity detector 121 detects a skip in the continuity_counter as the discontinuity between the programs during MPEG-2 decoding of the recorded and reproduced programs, and restarts the MPEG-2 decoder 12 when the discontinuity is detected. As a result, it offers an advantage of being able to detect the switching between the reproduced programs, making it possible to prevent the output of abnormal video, audio and data.

Embodiment 5

The present embodiment 5 utilizes, as a concrete method to be applied to the discontinuity detector 121 of the embodiment 2, the Decoding Time Stamp (DTS) in the MPEG-2 PES (Packetized Elementary Stream) packet layer according to the ISO/IEC 13818-1 standard. The DTS indicates the decoding time of access units in the elementary stream. In the case of video, it indicates the time of decoding pictures.

Considering continuously input video data in accordance with the specification, the current DTS and the next DTS have a time difference of one picture interval of about 33 milliseconds in the video according to the NTSC (National Television System Committee) standard. In general, any two programs differ in absolute time (System Time Clock). Accordingly, the program switching point, that is, the discontinuity point, can be detected when the time difference between the DTS of a current picture and that of the next picture differs from the one picture time period.

In view of this, the discontinuity detector 121 of the present embodiment 5 has a function to check the DTS values in the PES packet layer of the video in order to make a decision as to whether the time difference between the DTS values of any consecutive pictures is equal to the one picture time period. If the time difference is unequal to the one picture time period, the discontinuity detector 121 decides that the discontinuity occurs in the program, and restarts the MPEG-2 decoder 12.

As described above, the present embodiment 5 is configured such that the discontinuity detector 121 decides the discontinuity between the programs by detecting whether the difference between the consecutive DTSs in the PES packet layer in the successively input video is equal to the one picture interval while carrying out the MPEG-2 decoding of the recorded and reproduced programs, and restarts the MPEG-2 decoder 12 when the discontinuity is detected. As a result, it offers an advantage of being able to detect the switching between the reproduced programs, making it possible to prevent the output of abnormal video, audio and data.

Embodiment 6

The present embodiment 6 utilizes, as a concrete method to be applied to the discontinuity detector 121 of the embodiment 2, a vbv_delay in the picture header according to the ISO/IEC 13818-2 standard. The vbv_delay indicates the time for filling, before starting the decoding at a specified bit rate, the input buffer (VBV buffer) of a virtual decoder, which is called a VBV (Video Buffer Verifier) in the Annex C according to the ISO/IEC 13818-2 standard. After writing the data in the VBV buffer for the vbv_delay time, the decoding of the video is started. The decoding of the video is completed instantaneously according to the VBV standard.

On the coding side, a value of the vbv_delay is set for each picture so that the VBV buffer never collapses even if the decoding of the data is started from any picture. When the decoding side starts the decoding of the video after filling data into the VBV buffer for exactly the vbv_delay time, the data will be stored in the VBV buffer by an amount that is specified by the vbv_delay and by the predetermined bit rate at the start of the decoding of each picture.

However, when the program is changed and hence the discontinuity appears in the data, the amount of the data stored in the VBV buffer at the start of the picture decoding will differ from that calculated from the vbv_delay and the specified bit rate. In view of this, the discontinuity detector 121 in the present embodiment 6 compares the amount of data stored in the VBV buffer at the start of decoding of each picture with the value calculated from the vbv_delay and specified bit rate, so that it can decide that the program discontinuity takes place when the two values differ more than a predetermined value, and restart the MPEG-2 decoder 12.

As described above, the present embodiment 6 is configured such that the discontinuity detector 121 detects the discontinuity between the programs by comparing the amount of data stored in the VBV buffer at the start of decoding of each picture with the value calculated from the vbv_delay and specified bit rate during MPEG-2 decoding of the recorded and reproduced programs, and restarts the MPEG-2 decoder 12 when the discontinuity is detected. As a result, it offers an advantage of being able to detect the switching between the reproduced programs, making it possible to prevent the output of abnormal video, audio and data.

Embodiment 7

The present embodiment 7 utilizes, as a concrete method to be applied to the discontinuity detector 121 of the embodiment 2, at least two of the discontinuity detection schemes described in the foregoing embodiments 3, 4, 5 and 6. Since the program_number of the embodiment 3 consists of 16-bit data, although it is a very low probability of $1/2^{16}$, the same number can be assigned to different programs. The probability can increase depending on the manner of using the program_number.

In addition, the continuity_counter of the transport packets having the corresponding PID described in the embodiment 4 is a 4-bit counter. Accordingly, consecutive values can appear at the probability of $1/2^4$ even for different programs. Furthermore, the DTS described in the embodiment 5 is 33-bit data with a period of 90 kHZ. Although at a very low probability of about $1/2^{20}$ when allowing a certain extent of tolerance, the continuity decision by the DTS can make an erroneous decision that the programs are continuous even though they are actually discontinuous. Likewise, although at a low probability of about $1/2^{10}$, the 16-bit vbv_delay of the embodiment 6 can make an erroneous decision that the programs are continuous even though they are actually discontinuous in the case where allowing a certain extent of error for the continuity decision.

In view of this, the embodiment 7 combines two or more discontinuity decision schemes of the embodiments 3, 4, 5 and 6 to prevent the possible erroneous discontinuity decision, thereby eliminating the possibility to a negligible level in practice. The method and number of combining these schemes can be changed in accordance with required conditions of the system to which the present invention is applied.

As described above, the present embodiment 7 is configured such that the discontinuity detector 121 detects, during the MPEG-2 decoding of the recorded and reproduced programs, the discontinuity between the programs using a method combining two or more schemes selected from detecting the changes in the program_number, detecting the changes in the continuity_counter, deciding on whether the difference between the consecutive DTSs in the PES packet layer is equal to the one picture time period, and comparing the amount of data stored in the VBV buffer at the start of decoding each picture with the value calculated from the vbv_delay and specified bit rate and restarting the MPEG-2 decoder 12 when the discontinuity is detected. As a result, it offers an advantage of being able to detect the switching between the reproduced programs quickly and accurately, making it possible to more strictly prevent the output of abnormal video, audio and data.

Embodiment 8

Figure 5:
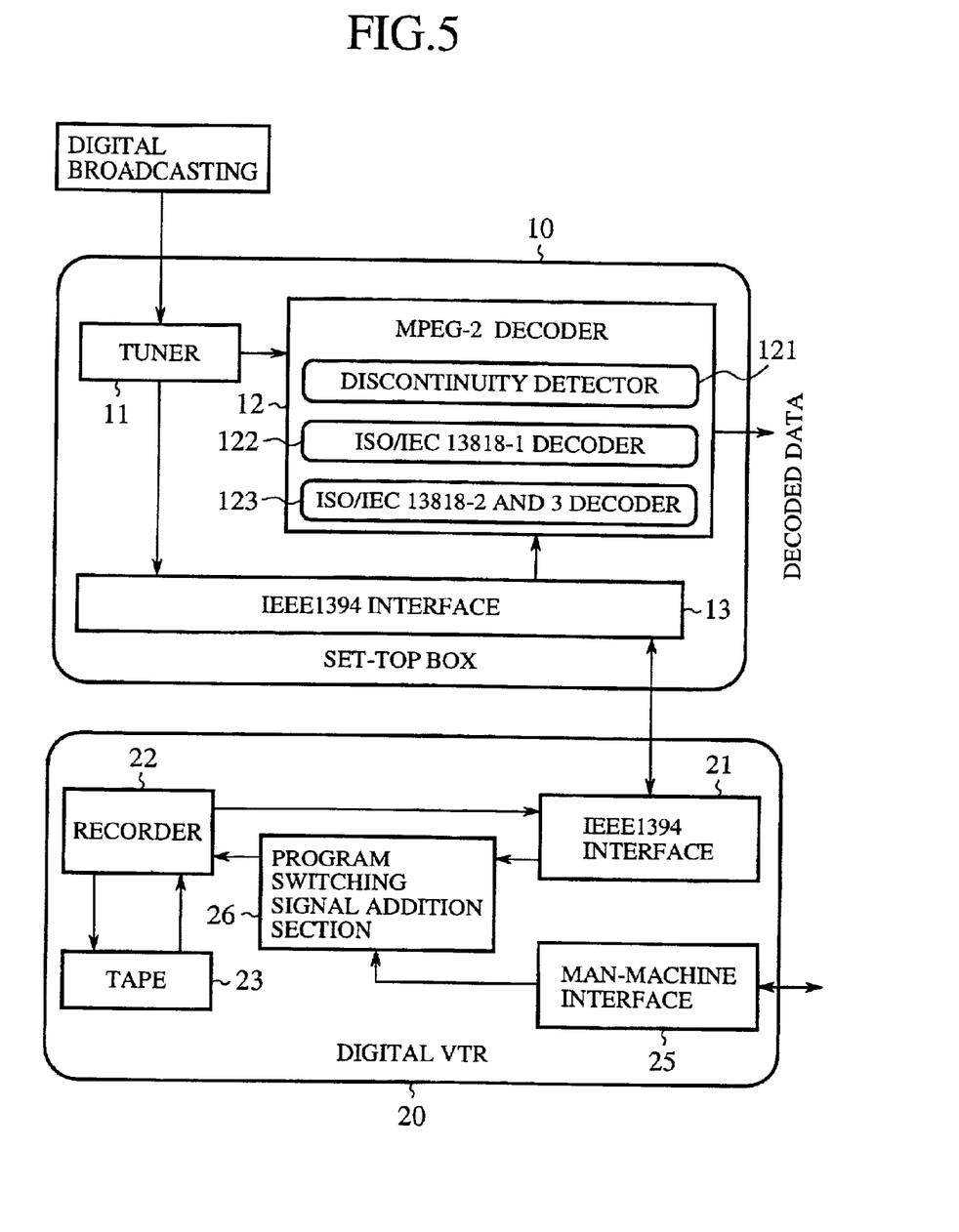
FIG. 5 is a block diagram showing a configuration of an embodiment 8 of the digital data recording and reproducing system in accordance with the present invention.

FIG. 5 is a block diagram showing a configuration of an embodiment 8 of the digital data recording and reproducing system in accordance with the present invention. In this figure, the reference numeral 25 designates a man-machine interface for transferring instructions from a user; and 26 designates a program switching signal addition section for recording a program in connection with a program switching signal in response to the user instruction via the man-machine interface 25. The remaining configuration of the present embodiment 8 is the same as that of the embodiment 3 as shown in FIG. 3.

Next, the operation of the present embodiment 8 will be described.

When switching a program to be stored in response to the user instruction via the man-machine interface 25, the program switching signal addition section 26 stores not only the program itself, but also the program switching signal as a marker indicating the program switching. When reproducing the program, the program and the program switching signal are transferred to the MPEG-2 decoder 12 via the IEEE1394 interfaces 21 and 13. Then, detecting the program switching signal, the discontinuity detector 121 decides that the program discontinuity takes place, and restarts the MPEG-2 decoder 12.

As described above, the present embodiment 8 can detect all the discontinuous points of the programs without fail by recording the program switching signals added to the programs. As a result, it offers an advantage of being able to completely prevent the output of the abnormal video, audio and data.

Although the foregoing embodiments 1–8 are described in the condition that they employ the set-top box 10, it is obvious that the present invention is also applicable to TV sets and the like incorporating the function of the set-top box 10.

Furthermore, although the foregoing embodiments 1–8 are described by taking an example of using the digital VTR, it is obvious that other recording or storing media can also be utilized.

What is claimed is:

1. A digital data recording and reproducing system comprising:
    a receiver for receiving transmitted digital data including a plurality of multiplexed programs consisting of video, audio, data and so forth which are subjected to compression;
    a recorder for storing received digital data, and for reproducing recorded digital data;
    a decoder for decoding digital data reproduced by said recorder to restore the programs; and
    a discontinuity detector for detecting a discontinuity between the programs while said decoder is decoding the compressed digital data of the programs,
    wherein said discontinuity detector restarts said decoder upon detecting the discontinuity between the programs.

2. The digital data recording and reproducing system according to claim 1, wherein said discontinuity detector detects the discontinuity between the programs by using information specified in IEC/ISO 13818.

3. The digital data recording and reproducing system according to claim 2, wherein said discontinuity detector detects the discontinuity between the programs by using program—number specified in ISO/IEC 13818 as information for indicating a number of each of the programs.

4. The digital data recording and reproducing system according to claim 2, wherein said discontinuity detector utilizes a continuity_counter that is specified in ISO/IEC 13818 and increments with each transport packet having a corresponding PID (Packet Identification) in a transport packet layer, and detects the discontinuity—between the programs in response to a change in the increment of the continuity_counter.

5. The digital data recording and reproducing system according to claim 2, wherein said discontinuity detector utilizes a Decoding Time Stamp specified in ISO/IEC 13818 for indicating a time when each access unit is to be decoded, and detects the discontinuity between the programs in response to a time difference between the Decoding Time Stamp.

6. The digital data recording and reproducing system according to claim 2, wherein said discontinuity detector utilizes a vbv_delay in a picture header, and detects the discontinuity between the programs by comparing an amount of data to be stored in a buffer calculated from the vbv_delay with an amount of data of the program actually stored in the buffer before decoding.

7. The digital data recording and reproducing system according to claim 2, wherein said discontinuity detector utilizes at least two of a program_number, a continuity_counter, Decoding Time Stamp and a vbv_delay in a picture header, which are specified in ISO/IEC 13818 for indicating a number of each program, for incrementing with each transport packet with a corresponding PID in a transport packet layer, for decoding time of each access unit and for indicating an amount of time a picture header should reside in a VBV buffer before decoding, respectively.

8. The digital data recording and reproducing system according to claim 1, further comprising a program switching signal addition section for recording, when a program to be stored is switched in response to a user instruction, not only the program itself, but also a program switching signal indicating the program switching, wherein said discontinuity detector decides that the program discontinuity takes place when it detects the program switching signal.

9. The digital data recording and reproducing system according to claim 1, wherein said discontinuity detector outputs fixed data when detecting the discontinuity between the programs.

10. A digital data recording and reproducing system, comprising:
   a receiver for receiving digital data including a plurality of multiplexed programs;
   a recorder for storing and reproducing said received digital data;
   a decoder for decoding digital data reproduced by said recorder to restore the programs; and
   a detector for detecting discontinuity between the programs during said decoding to restart the decoder.

11. A method for recording and reproducing digital data, comprising:
   transmitting digital data to a receiver including a plurality of multiplexed programs;
   providing a recorder for storing and reproducing said transmitted digital data;
   providing a decoder for decoding digital data reproduced by said recorder to restore the programs; and
   providing a detector for detecting discontinuity between the programs during said decoding to restart the decoder.

* * * * *